A. ABEL.
Dentist's and Barber's Chair.
No. 229,227.                    Patented June 29, 1880.
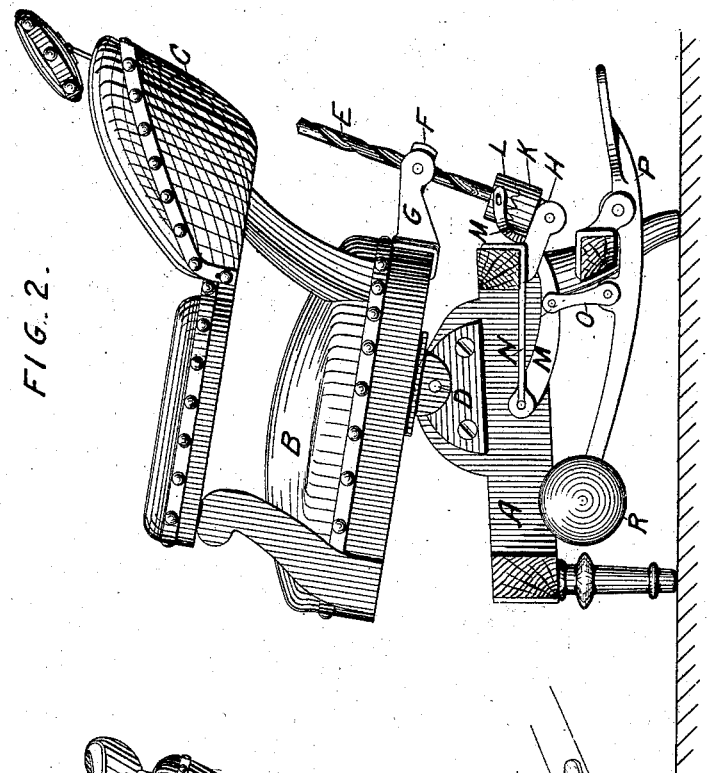
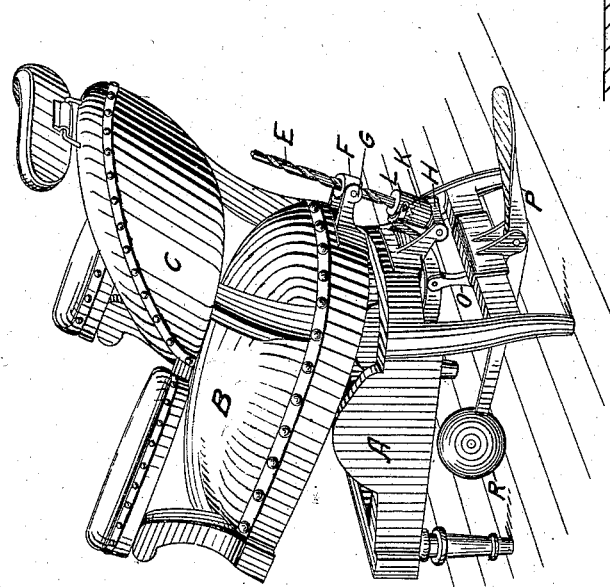
WITNESSES.                              INVENTOR.

UNITED STATES PATENT OFFICE.

ANTHONY ABEL, OF NEW YORK, N. Y.

DENTIST'S AND BARBER'S CHAIR.

SPECIFICATION forming part of Letters Patent No. 229,227, dated June 29, 1880.

Application filed November 8, 1879.

*To all whom it may concern:*

Be it known that I, ANTHONY ABEL, of the city, county, and State of New York, United States of America, have invented a new and useful Improvement in Dentists' and Barbers' Chairs, of which the following is a specification.

This invention relates to improvements in barbers' and dentists' chairs; and it consists, essentially, in the combination, with a stationary supporting-frame and a tilting seat-frame pivoted thereon, of a rotating locking-screw connected with the stationary frame, a nut arranged on said screw and connected to a rearward extension on the tilting seat, and a clutch for permitting or preventing the rotation of the screw, whereby the movement of the nut on the screw serves to rotate the latter and adjust the tilting seat, as will be fully hereinafter described.

The invention also consists of certain other features, which are hereinafter specifically described, and pointed out in the claims.

Figure 1 is a perspective view of a chair, showing the screw and its attachments in working position. Fig. 2 is a side elevation and section of some of the devices for holding the screw.

At A is represented the supporting-frame of the chair. B is the seat, and C is the back. At D are the pivots upon which the seat is tilted upon the frame A. The lock-screw is at E, and its nut at F, said nut being pivoted in a bracket at G, which is attached to the back of the seat-frame, as shown.

The lower end of the screw is supported in a step, as at H, fastened to a bar on the supporting-frame, and near the lower end there is fastened upon the screw a faced ratchet-wheel, as at K, which revolves with it and may form a part of the screw, if desired.

The pitch of the thread of the screw is made sufficiently great to turn easily in its nut whenever the nut is moved up and down upon it, as by raising and lowering or tilting the back of the chair; consequently if the screw is in any manner prevented from turning, the back will be held at whatever position it is placed when the screw is locked. This may be accomplished in various ways; but the plan preferred is by a ratchet-pawl, as at L, which is made to correspond to the ratchet-faced wheel K, making two disks like the well-known form of faced clutches, and the stationary part is supported by the lever, as shown at M, which is pivoted to a bracket at N on a stationary portion of the frame. This pawl or clutch lever is operated by a link, as at O, attached to the pedal-lever at P, one end of which has a weight, as at R, to assist in holding the clutch in contact with the ratchet-wheel, while the other end is provided with a plane, as a pedal, for operating it by pressure from the foot of the operator.

When a person is seated in such a chair and desirous to be tilted farther back, the attendant has only to press his foot on the pedal at P to raise the clutch at L, and thereby release the screw, which permits the back to be tilted to any desired position, where it is held by releasing the pedal and allowing the clutch to hold the screw from turning in its nut.

It is evident that another form of clutch may be used to hold the screw, and the screw may be reversed with the clutch at its upper end and arranged so that the clutch may be operated by the hand instead of the foot, and it may also be a spring clutch or pawl to hold the screw from turning; so, also, the screw may be formed of ribs instead of grooves, as here shown.

It is also evident that the back only of the chair may be tilted, having the seat stationary, and with the same locking and holding screw and clutch.

I therefore claim—

1. The combination, with a stationary supporting-frame and the tilting seat-frame pivoted thereon, of a rotating locking-screw connected with the stationary frame, a nut arranged on said screw and connected to a rearward extension on the tilting seat, and a clutch for permitting or preventing the rotation of the screw, substantially as described.

2. The combination, with the seat and stationary frame connected together by pivots, so that the former may tilt on the latter, of a screw connected with the seat and stationary frame and a clutch for locking and unlocking said screw, substantially as described.

3. The combination, with the stationary frame and the tilting seat pivoted thereon, of a locking-screw connected with the stationary frame, a nut arranged on said screw and connected with a rearward extension on the chair-seat, a clutch for permitting and preventing the rotation of the locking-screw, a pedal-lever, and intermediate devices forming a positive connection between the clutch and pedal-lever, substantially as described.

ANTHONY ABEL.

Witnesses:
EUGENE N. ELIOT,
JOHN WM. RIPLEY.